United States Patent [19]

McNeill

[11] Patent Number: 4,653,764
[45] Date of Patent: Mar. 31, 1987

[54] RESTRAINING DEVICE FOR SHOPPING CART OR THE LIKE

[75] Inventor: Samuel J. McNeill, Redondo Beach, Calif.

[73] Assignee: Fred N. Schwend, Mira Loma, Calif.; a part interest

[21] Appl. No.: 828,509

[22] Filed: Feb. 12, 1986

[51] Int. Cl.⁴ ............................................. B62D 39/00
[52] U.S. Cl. .................... 280/33.99 C; 188/83; 188/218 A
[58] Field of Search ............... 280/33.99 A, 33.99 C, 280/33.99 R; 188/83, 218 A, 84; 16/35 R; 301/6 R, 6 E; 152/151, 208, 246

[56] References Cited
U.S. PATENT DOCUMENTS

| | | | |
|---|---|---|---|
| 3,102,298 | 9/1963 | Sheahan | 188/84 |
| 3,924,292 | 12/1975 | Christensen | 16/35 R |
| 4,212,092 | 7/1980 | Ferrari | 16/35 R |
| 4,246,677 | 1/1981 | Downing et al. | 16/35 R |
| 4,537,415 | 8/1985 | Delahoussaye et al. | 188/84 |
| 4,582,188 | 4/1985 | Seiz et al. | 188/84 |

Primary Examiner—John J. Love
Assistant Examiner—Eric D. Culbreth
Attorney, Agent, or Firm—Fred N. Schwend

[57] ABSTRACT

A shopping cart or the like having supporting wheels, one or more of which has a non-rotating detenting element rotatably engaged by rollers of elastomeric material carried by the wheel. Detenting formations on the element yieldably brake the wheel in different rotated positions to restrain free movement of the cart from a parked condition while permitting intentional movement of the cart with a minimum of resistance.

8 Claims, 4 Drawing Figures

RESTRAINING DEVICE FOR SHOPPING CART OR THE LIKE

BACKGROUND OF THE INVENTION

1. Field of the Invention

This invention relates to shopping carts or the like and has particular reference to means for restraining free rolling of such carts, such as when parked on a slope.

2. Description of the Prior Art

For many years stores such as grocery stores, department stores, hardware stores, etc., have, for the convenience of their customers, provided shopping carts in which the customer can carry purchased merchandise throughout the store and from the store to a parked car. In many cases, the car parking areas are located on sloping ground for the purpose of water drainage or merely to follow the ground contour on which the parking area is situated.

Such shopping carts are generally mounted on free rolling wheels, certain or all of which may swivel to facilitate manipulating the cart. Although such carts are easy to control, they tend to roll freely in an uncontrolled manner down any incline when not otherwise restrained. This is particularly aggravating when the customer parks the cart and is transferring merchandise from the cart to his or her car, at which time the cart is unrestrained and free to move.

Accordingly, a dangerous situation can develop since the cart may freely roll into other cars, structures, or persons in the parking area, resulting in damage to property and injuries to persons.

In my copending patent application, Ser. No. 6/760,758, filed July 26, 1985, now U.S. Pat. No. 4,603,871. I have disclosed a wheel for a shopping cart or the like which restrains the cart from free rolling movement when parked. Although such wheel operates satisfactorily, it tends to create a noticeable amount of noise and also weighs somewhat more than a standard wheel without any such restraining means.

SUMMARY OF THE INVENTION

A principal object of the present invention is to provide an improved means for restraining free rolling of a shopping cart or the like down an incline after being parked on such incline.

Another object is to restrain a shopping cart or the like from rolling down an uncline of a normally encountered slope while permitting the cart to be easily moved about once it is started in motion.

Another object is to readily modify existing wheels of a shopping cart or the like to restrain free rolling of the wheels.

A further object is to provide a wheel of the above type which is substantially noiseless in operation.

A further object is to provide a wheel of the above type which has few moving parts, and is inexpensive to manufacture, and is of relatively light weight.

According to the present invention, at least one of the wheels of a shopping cart or the like is provided with at least one roller of elastomeric material which is carried by the wheel in an orbiting manner about a non-rotating detenting element and in rolling engagement therewith. Detenting formations on the element detent the roller when the cart is in parked condition to restrain the cart from free movement but offer little resistance once the cart is set in motion.

BRIEF DESCRIPTION OF THE DRAWINGS

The manner in which the above and other objects of the invention are accomplished will be readily understood on reference to the following specification when read in conjunction with the following drawing, wherein.

DESCRIPTION OF THE PREFERRED EMBODIMENT

Figure 1:
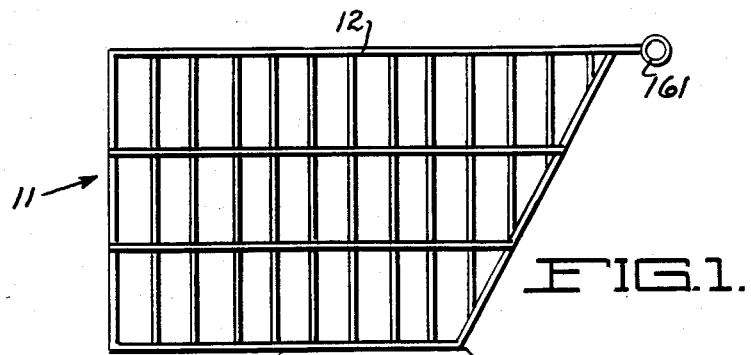
FIG. 1 is a side view of a typical shopping cart embodying a preferred form of the present invention.

While this invention is susceptible to embodiment in many different forms, there is shown in the drawings and will be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring particularly now to FIG. 1, a typical shopping cart is depicted comprising a body, generally indicated at 11, formed by a wire basket 12 mounted on a tubular supporting frame 13 which, in turn, is mounted on a pair of spaced front wheels, one of which is shown at 14, and a pair of spaced rear wheels, one of which is shown at 15. A handle 161 is suitably attached to the rear of the basket 12 to facilitate pushing or pulling the cart as desired.

Figure 3:
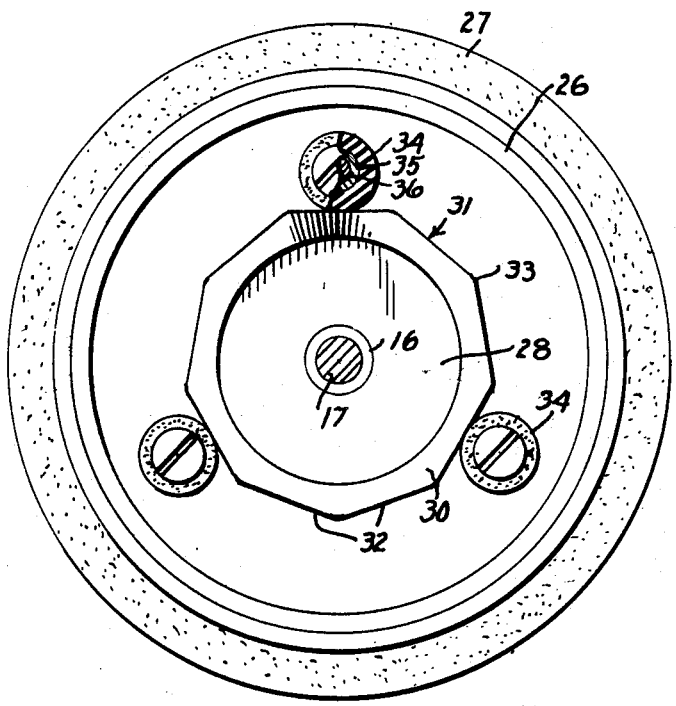
FIG. 3 is a sectional view taken substantially along line 3—3 of FIG. 2.
Figure 2:
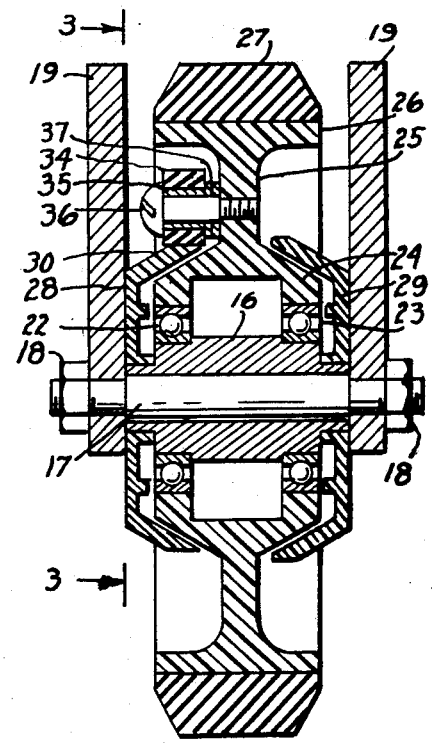
FIG. 2 is an enlarged sectional view taken substantially along line 2—2 of FIG. 1.

The front and rear wheels 14 and 15, respectively, are similar in construction and each comprises an axial bearing sleeve 16 (FIGS. 2 and 3) which is secured as by frictional engagement on a shaft 17 secured against rotation by screw threaded nuts 18 between spaced arms 19 of a u-shaped fork 20 mounted for swiveling movement on a depending leg 21 of the frame 13.

The sleeve 16 supports the inner races of a pair of spaced ball bearings 22 and 23, the outer races of which rotatably support the hub 24 of a wheel flange 25. The latter has a wheel rim 26 formed thereon, on which is mounted a tire 27 of rubber.

Circular dust covers 28 and 29 of plastic or similar substantially rigid material are secured against rotation over the opposite ends of the bearing sleeve 16, as by a suitable adhesive, to cover the bearings 22 and 23, respecttively. Conical flanges 30 are formed on the outer peripheries of the dust covers and extend over the respective ends of the wheel hub 24.

The flange 30 of dust cover 28 is formed with an outer track or roller engaging surface 31 extending generally concentric of the axis of rotation of the wheel 14. The track 31, when viewed in FIG. 3, forms a regular polygon with nine plane faces 32, adjacent faces meeting each other at an apex 33. The track 31 is frictionally engaged by three equiangularly spaced detenting rollers 34. Each roller 34 is formed of elastomeric material, such as rubber, which is securely mounted on a bearing bushing 35 rotatably mounted on a bearing pin screw 36 threadably attached in the wheel flange 25.

Annular spacers 37 space the roller outwardly from the flange 25. Thus, the rollers 34 concurrently engage either three faces 32 or three apices 33.

Figure 4:
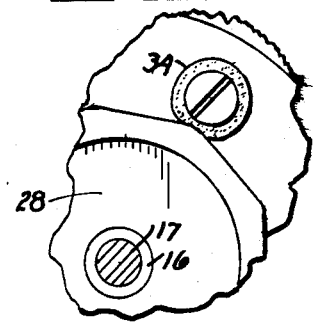
FIG. 4 is a fragmentary sectional view taken in the same direction as FIG. 2 but illustrating the cart wheel in a different rotated position.

The diameters of the rollers 34 are such that they will continuously frictionally engage the track 31. However as the rollers move over the apices 33, as seen in FIG. 4 they will be temporarily deformed slightly, thereby offering a small resistance to rotation of the wheel 14. Cumulatively, the three rollers will thus be effective to yieldably brake the cart when engaging the faces 32.

Accordingly, when the cart is parked on any normally encountered slope, the wheel 14 will be yieldably detented to restrain free movement of the cart. However, when the cart is pushed or otherwise intentionally moved the rollers 34 will move over the track with a minimum of resistance. The amount of detenting action can be varied by substituting rollers 34 of different diameters and/or different degrees of hardness.

The aforementioned detenting feature is extremely quiet in operation and requires no attention on the part of the cart operator. It has relatively few parts and contributes little to the weight of the wheel. Also, the feature may be incorporated in any one or more of the cart wheels 14 and 15.

Although the invention is particularly applicable to shopping carts, it may also be embodied in wheels for similar vehicles, such as luggage carts, warehouse carts, baby buggies, etc.

I claim:

1. A device for restraining a shopping or the like cart from free movement from a parked position, said cart comprising a frame and supporting wheels therefor, comprising bearing means for rotatably mounting at least one of said wheels on said frame for movement about a horizontal axis, a detenting element having a roller engaging surface extending about said axis, said roller engaging surface having at least one detenting formation thereon, means preventing rotation of said element about said axis, a roller of elastomeric material, means on said wheel carrying said roller in rolling engagement with said surface, said detenting formation yieldably detenting said roller element when said cart is in a parked position whereby to restrain said cart from free movement while permitting intentional movement of said cart.

2. A device as defined in claim 1 wherein said roller engaging surface has a plurality of additional detenting formations therearound.

3. A device as defined in claim 2 comprising a plurality of additional rollers of elastomeric material, and means on said wheel carrying said additional rollers in rolling engagement with said surface.

4. A device as defined in claim 3 wherein said rollers and said detenting formations are equally spaced about said axis, the number of said detenting formations being an equal multiple of the number of said rollers whereby said rollers will concurrently engage adjacent ones of said detenting formations.

5. A device as defined in claim 1 wherein said roller engaging surface defines a regular polygon and each of the faces of said polygon forms one of said detenting formations.

6. A device as defined in claim 1 wherein said detenting element forms a dust cover covering a portion of said wheel.

7. A device for restraining a shopping or the like cart from free movement from a parked position, said cart comprising a frame and supporting wheels therefor, comprising bearing means rotatably mounting at least one of said wheels on said frame for movement about a horizontal axis, a detenting element having a roller engaging surface extending about said axis, means preventing movement of said element about said axis, said roller engaging surface having at least one detenting formation thereon, a roller element rotatably carried by said wheel eccentrically of said axis, said roller element being engageable with said detenting formation upon rotation of said wheel, and one of said elements comprising resilient material, said detenting formation yieldably detenting said roller element when said cart is in a parked position whereby to restrain said cart from free movement while permitting intentional movement of said cart.

8. A device as defined in claim 7 wherein said roller element comprises said resilient material.

* * * * *